C. P. SMITH.
NON-SKID AND TRACTOR ATTACHMENT FOR VEHICLES.
APPLICATION FILED FEB. 3, 1916.

1,203,066.  Patented Oct. 31, 1916.

WITNESS
Wm. F. Drew

INVENTOR.
Clayton P. Smith
BY
F. Booth
ATTORNEY

UNITED STATES PATENT OFFICE.

CLAYTON P. SMITH, OF BERKELEY, CALIFORNIA.

NON-SKID AND TRACTOR ATTACHMENT FOR VEHICLES.

1,203,066.

Specification of Letters Patent.

Patented Oct. 31, 1916.

Application filed February 3, 1916. Serial No. 75,993.

*To all whom it may concern:*

Be it known that I, CLAYTON P. SMITH, a citizen of the United States, residing at Berkeley, in the county of Alameda and State of California, have invented certain new and useful Improvements in Non-Skid and Tractor Attachments for Vehicles, of which the following is a specification.

My invention relates to that class of non-skid, tractor devices for vehicles in which an endless traveling tread member is fitted pulley-wise to the vehicle wheel, the other bight of said member being fitted to a fixed terminal guide pulley secured in convenient proximity. Devices of this nature are useful in connection especially with the wheels of motor vehicles, and serve to increase traction on sandy surfaces, to protect the tires on rocky roads, and to prevent skidding on slippery pavements. They also have among other advantages that of not injuring the tires by their own application and contact. There still remain, however, certain difficulties in the use of this type of devices, which it is the object of my invention to overcome. The principal one of these difficulties grows out of the fact that owing to the necessarily high speed of travel of the endless tread member and relatively small diameter and consequently high speed of rotation of the fixed guide pulley, an abnormal degree of heat is quickly engendered in and about said pulley which no amount of lubrication which it is practicable to apply, is sufficient to overcome. Another difficulty arises from the inherent elasticity of the wheel-tire resulting in imperfect and uncertain tension on the endless traveling tread-member. Still another difficulty follows the wear and tear due to dirt and grit, the customary position of the guide pulley rendering it peculiarly open to this disadvantage. Finally, there is the difficulty of readily disposing of the endless tread-member when not in use, and applying it again for use.

With the object of overcoming or reducing these difficulties, my invention consists in the novel construction, arrangement and combination of my non-skid tractor attachment which I shall now fully describe, by reference to the accompanying drawings, in which—

Figure 1:
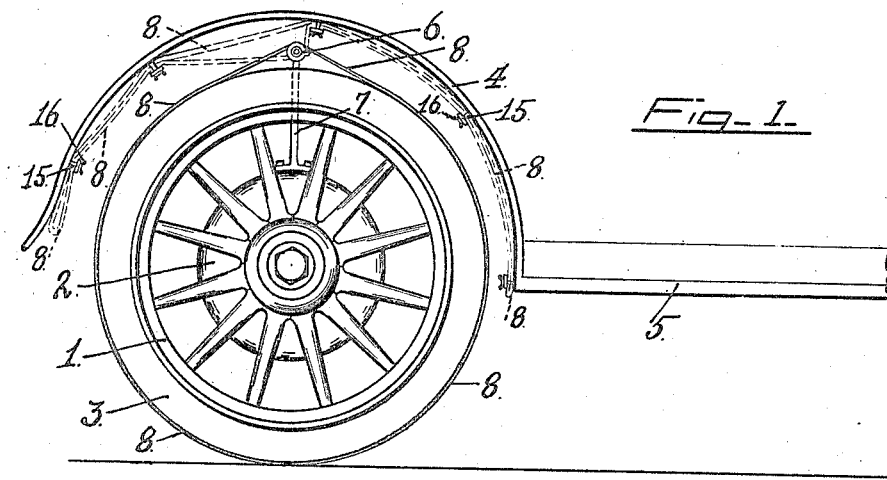
Figure 2:
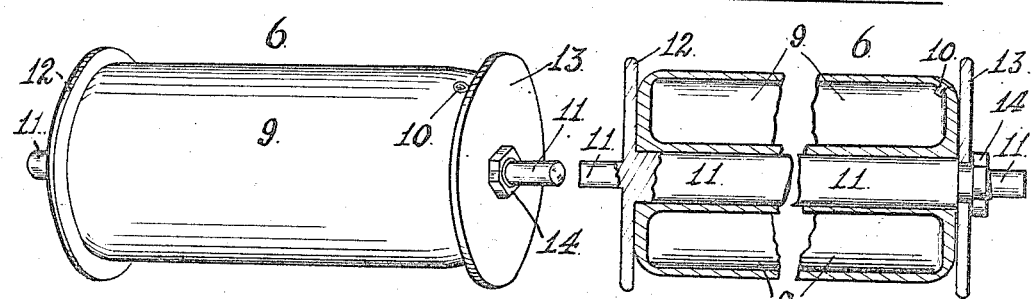
Figure 3:
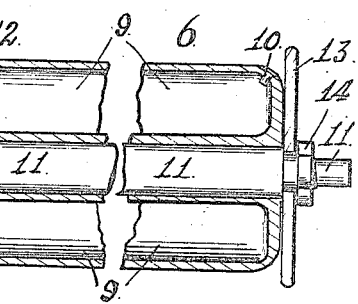
Figure 5:
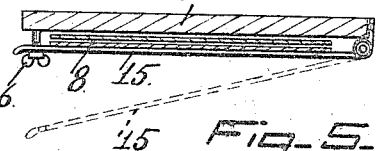
Figure 4:
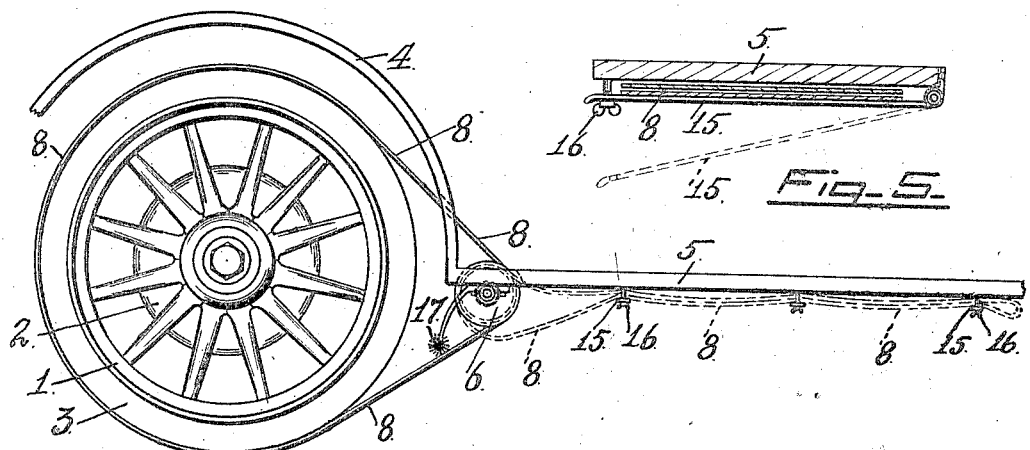

Figure 1 is a fragmentary side view of the rear end of an automobile, showing the application of my attachment in its preferred arrangement. Fig. 2 is a perspective view, enlarged, of the guide-pulley member of my attachment. Fig. 3 is a longitudinal section, broken, of the guide pulley of Fig. 2. Fig. 4 is a view similar to Fig. 1, showing a modified arrangement of my attachment. Fig. 5 is a side elevation of the preferred form of supporting means for the endless traveling tread-member when out of use.

1 is a wheel of a motor vehicle, and 2 is its brake drum.

3 is the usual pneumatic tire of the wheel.

4 is the mud-guard and 5 is the running board.

6 indicates the guide-pulley as a whole. In the preferred arrangement of my invention, this pulley is located above the wheel in substantially the plane of its vertical diameter. It is independent of the wheel and may be fixed in position by a variety of means and from any suitable support, say, for example, the mud-guard, or from the chassis, or, as here shown, from the brake-drum 2, by means of a bracket 7, the latter being preferable in that thereby the pulley and wheel are intimately associated for general movement in unison.

8 is the endless traveling tread-member. This may be made of any suitable material and in any approved fashion. It may be a chain-belt or a woven-wire belt, or a belt made of reinforced leather or fabric. This tread-member passes pulley-wise about the wheel-tire 3 and about the guide pulley 6.

In order to avoid excessive heating of the guide-pulley, I make it as shown in Figs. 2 and 3. The contact surface or face of the pulley is a resilient cushion. The best form of this cushion is pneumatic, and consists of a double walled, annular-chambered rubber cylinder 9, provided with a nipple 10 for inflating and deflating it. This cylinder is fitted upon a central shaft 11 and is clamped thereon between a fixed head 12 of the shaft at one end, and a sliding head 13 at the other end, by means of a nut 14. The effect of this pulley, considering its contact surface as an elastic cushion merely, is to keep a constant and proper tension on the endless traveling tread-member 8 by compensating for the elasticity of the wheel tire. In its best form as a pneumatic cushion the pulley is less liable to be unduly heated, and it is therefore practicable to properly lubricate its bearings. Also its air content can be readily renewed for cooling effect.

In the position of the pulley, above the wheel, it is less liable to be affected by dirt and grit. I do not, however, confine myself to the location of the pulley above the wheel, for if the matter of less dirt and grit be considered as merely relative the pulley may be located elsewhere, as, for example, on the running board 5, as I show in Fig. 4. In order to dispose of the endless tread-member 8 when not in use, and to provide for its ready application for use again, I arrange for hanging it up, after it has been slipped off the wheel tire, under the part of the vehicle which the guide-pulley 6 underlies. Thus in Fig. 1, I show it hung up or disposed of under the mud-guard, and in Fig. 4, I show it disposed of and supported under the running board. The best form of support consists of hinged or swinging bars 15, adapted to clamp the tread member tightly up against the mud-guard or the running board as the case may be, said bars being adapted to be detachably fastened by means of the wing nuts 16. The stored position of the tread-member is shown by the dotted lines in Figs. 1 and 4. To thus dispose of and store the tread-member it is not removed from the guide-pulley, but remains upon it, and said member is therefore, always ready to be placed in use again by simply releasing the bars 15, to free it, and then slipping it upon the wheel tire. This disposition of the endless tread-member, in addition to its great convenience, yields the further important advantage of not having to provide elaborate and expensive mountings for the guide pulley which have in view the removal of said pulley in order to enable the tread-member to be removed and packed away, as is generally the case. In order to keep the inner surface of the tread-member free from dirt and clean, I may provide a scraper, or a brush, such as shown at 17 in Fig. 4, to act upon said surface.

I claim:—

1. In combination with a vehicle-wheel, an endless traveling tread-member fitted at one of its bights upon the wheel tire, and a fixed guide-pulley having a pneumatic cushion face upon which the other bight of the tread-member is fitted.

2. In combination with a vehicle-wheel having an elastic tire, an endless traveling tread-member fitted at one of its bights upon the wheel tire, and a fixed guide-pulley having a pneumatic cushion face upon which the other bight of the tread-member is fitted.

3. In combination with a vehicle-wheel, an endless traveling tread-member fitted at one of its bights upon the wheel-tire, and a fixed guide-pulley upon which the other bight of the endless tread-member is fitted, said guide pulley having a face consisting of an inflatable cylinder having a nipple for inflating and deflating it.

4. In combination with a vehicle-wheel, an endless traveling tread-member fitted at one of its bights upon the wheel-tire, and a fixed guide-pulley upon which the other bight of the endless tread-member is fitted, said guide pulley having a face consisting of an inflatable double walled, annular chambered cylinder having a nipple for inflating and deflating it.

5. In combination with a vehicle wheel, a fixed guide-pulley independent of said wheel, a member of the vehicle overlying said guide-pulley, an endless traveling tread-member fitted upon said pulley and upon the wheel-tire, and means carried by the overlying vehicle member adapted to support the endless tread-member when removed from the wheel-tire, and to release it for use again.

6. In combination with a vehicle wheel, a fixed guide-pulley independent of said wheel, a member of the vehicle overlying said guide-pulley, an endless traveling tread-member fitted upon said pulley and upon the wheel-tire, and means carried by the overlying vehicle member adapted to support the endless tread-member when removed from the wheel-tire, and to release it for use again, said means comprising swinging bars, and nuts for detachably fastening said bars.

7. In combination with a vehicle-wheel, and its mud-guard, a fixed guide-pulley lying under the mud-guard above the wheel, a bracket rising from the brake-drum and carrying said pulley, an endless traveling tread-member fitted upon said pulley and upon the wheel-tire, and means carried by the mud-guard adapted to support the endless tread-member when removed from the wheel-tire, and to release it for use again.

In testimony whereof I have signed my name to this specification in the presence of two subscribing witnesses.

CLAYTON P. SMITH.

Witnesses:
Wm. F. Booth,
S. Constine.

Copies of this patent may be obtained for five cents each, by addressing the "Commissioner of Patents, Washington, D. C."